United States Patent [19]

Burch

[11] Patent Number: 5,247,343
[45] Date of Patent: Sep. 21, 1993

[54] RAMAN SPECTROMETER HAVING INTERFEROMETER WITH OPTICAL SUBSTRACTION FILTERS

[75] Inventor: Robert V. Burch, Madison, Wis.

[73] Assignee: Nicolet Instrument Corporation, Madison, Wis.

[21] Appl. No.: 786,521

[22] Filed: Nov. 1, 1991

[51] Int. Cl.$^5$ .............................................. G01B 9/02
[52] U.S. Cl. ..................................... 356/346; 356/301
[58] Field of Search ........................ 356/346, 352, 301

[56] References Cited

PUBLICATIONS

P. R. Griffiths and J. A. de Haseth, *Fourier Transform Infrared Spectrometry*, John Wiley and Sons, 1986, pp. 298-311.
D. J. Cutler, "The Development of Fourier Transform Raman Spectroscopy," Spectrochimica Acta, vol. 46A, No. 2, 1990, pp. 123-129.
D. J. Cutler, "Fourier Transform Raman Instrumentation," Spectrochimica Acta, vol. 46A, No. 2, 1990, pp. 131-151.
F. J. Bergin, "A Microscope for Fourier Transform Raman Spectroscopy," Spectrochimica Acta, vol. 46A, No. 2, 1990, pp. 153-159.
C. J. Petty, et al., "Future Advances in Near Infrared Fourier Transform Raman Spectroscopy," Spectrochimica Acta, vol. 46A, No. 2, 1990, pp. 331-337.
Norman Wright, et al., "Fourier Transform Raman Spectrometry," paper published by Bio-Rad Digilab Division. Publication date unknown.
B. Schrader, et al., "NIR-FT-Raman-Spectroscopy, State of the Art," Journal of Molecular Structure, 217, 1990, pp. 207-220.
Advertisement by Physics Optics Corporation entitled "Raman Holographic Edge Filters," publication date unknown.

*Primary Examiner*—Samuel A. Turner
*Attorney, Agent, or Firm*—Foley & Lardner

[57] ABSTRACT

A spectrometer for Raman spectrometry has a radiation source which provides a beam of radiation directed onto a sample, sample collection optics which directs the radiation from the sample as an input beam into an interferometer, the output beam of the interferometer being focused onto a detector, and filters interposed in the input and output beams of the interferometer. The filters are preferably holographic notch filters. Optical subtraction occurring in the interferometer as a result of the filters provides enhanced attenuation of the Rayleigh line of the reflected radiation while substantially passing the Raman lines, with the two filters achieving attenuation of the Rayleigh line equivalent to that obtained by several comparable filters stacked together.

9 Claims, 3 Drawing Sheets

RAMAN SPECTROMETER HAVING INTERFEROMETER WITH OPTICAL SUBSTRACTION FILTERS

FIELD OF THE INVENTION

This invention pertains generally to the field of spectroscopy and particularly to Fourier transform Raman spectrometry.

BACKGROUND OF THE INVENTION

In Raman spectroscopy, a laser beam is directed onto a sample and the radiation reflected from the sample is collected, passed through an interferometer, and then detected. The reflected radiation is characterized by a strong component, known as the Rayleigh line, at the wavelength of the laser, with weaker secondary components, known as the "Stokes" and "anti-Stokes" lines, at wavelengths slightly above and below the laser wavelength. The Stokes and anti-Stokes lines are referred to collectively as the "Raman" lines. The objective in Raman spectroscopy is to analyze the Stokes and/or anti-Stokes lines for spectral information about the sample.

The Raman scattering effect is illustrated in FIG. 1. For example, using an Nd:YAG laser as the excitation source, the sample is raised to an excitation level equal to that of the source and it then decays in one of three possible ways. It can fall back to its original ground state, to the next higher energy state, or, if the original state was the first electronic state as expected by Boltzman's distribution, from the first electronic state to the ground state. These three possibilities result in the Rayleigh scattering, Stokes scattering, and anti-Stokes scattering, respectively.

A difficulty encountered in Raman spectroscopy is separating the relatively weak signals of the Raman lines from the relatively strong signal of the Rayleigh line. The Rayleigh line is usually very close to the Raman lines, and has a much greater intensity (typically, two to eight orders of magnitude greater) than the Raman line intensities. Because the strong Rayleigh line is very close to the weak Raman lines, the Rayleigh line will tend to swamp the Raman lines and limit the dynamic range of detection. Although electronic filtering may be utilized to reduce the effect of the Rayleigh line in the electrical signal after the beam is detected, this approach is usually not satisfactory because most detectors are severely disturbed by the large Rayleigh line component. Typically, elimination of the Rayleigh line in Raman spectrometers involves optical filtering of the scattered radiation to attenuate the Rayleigh line while leaving the Raman lines substantially unattenuated.

A typical prior art Raman spectrometer arrangement is shown in FIG. 2. The light beam 20 from a laser 21 is reflected by mirrors 22 and 23 to sample collection optics 25 which allows the beam 20 to strike the sample 27 and then collects the reflected radiation and collimates it into a beam 29. The beam of reflected radiation 29 is passed through a stack of filters 30 before the beam proceeds into an interferometer 32 (e.g., a Michelson interferometer shown schematically as having a beam splitter 34, a moving mirror 35 and a stationary mirror 36). After passing through the interferometer, the beam 37 is collected by optics shown schematically at 39 and focused onto a detector 40. To achieve sufficient attenuation of the Rayleigh line, the stack of filters 30, typically dielectric filters, produce attenuation of the Rayleigh line on the order of $10^{-6}$. Dielectric filters are conventionally edge filters, which attenuate either the Stokes or anti-Stokes line as well as the Rayleigh line. A disadvantage of the use of a filter stack is that the throughput of the passband of the filter is reduced by each additional filter. A throughput of only 30% of the desired Raman wavelengths would be typical for a five filter stack typically required to achieve $10^{-6}$ attenuation of the Rayleigh line.

SUMMARY OF THE INVENTION

In accordance with the present invention, a spectrometer for Raman spectrometry has a radiation source, such as a laser, sample collection optics which directs the laser beam onto the sample and collects the reflected radiation into a (preferably collimated) beam, an interferometer, a detector, optics for focusing the beam passed through the interferometer onto the detector, a first filter for attenuating the Rayleigh line placed preferably adjacent the interferometer in the input beam of the interferometer, and a second filter placed in the output beam of the interferometer, preferably adjacent the interferometer. The two filters cooperate synergistically to provide a much greater attenuation of the Rayleigh line than can be achieved with two or even several stacked filters in the input beam of the interferometer, while nonetheless leaving the Raman lines substantially unattenuated. The filters are preferably holographic notch filters. By mounting such filters so that they can be tilted relative to the normal to the collimated input and output beams, the band of wavelengths which are attenuated can be tuned by slightly tilting one or both filters. This tunability allows the passband to be moved closer to the excitation wavelength line (the Rayleigh line) than is economically feasible.

It is believed that the two filters of the present invention interposed in the input and output beams of the interferometer take advantage of the 180° phase shift between the two modulated beams comprising the output beam of the interferometer. In addition, the frequency selective reflective properties of holographic notch filters result in a total filter performance that far exceeds the sum of the performance of the individual filters. Utilizing the present invention, only two holographic notch filters are needed to achieve attenuations of the Rayleigh line in excess of $10^{-7}$ while allowing passband throughput for the Raman lines typically of 60% or greater.

Further objects, features and advantages of the invention will be apparent from the following detailed description when taken in conjunction with the accompanying drawings.

DETAILED DESCRIPTION OF THE INVENTION

In accordance with the present invention, filters are placed in the input and output beams of the interferometer in a Raman spectrometer to achieve an optical subtraction effect. Such a filter arrangement takes advantage of what is believed to be a 180° phase shift between the two modulated beams forming the output beam of the interferometer. As described further below, the placement of the filters also preferably takes advantage of the frequency selective reflective properties of holographic notch filters.

Figure 1:
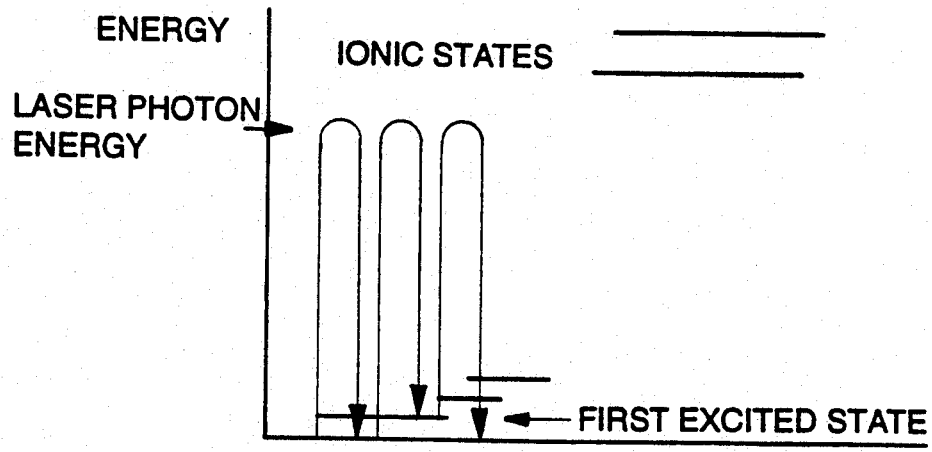
FIG. 1 is a simplified graph illustrating the Raman scattering effect.
Figure 2:
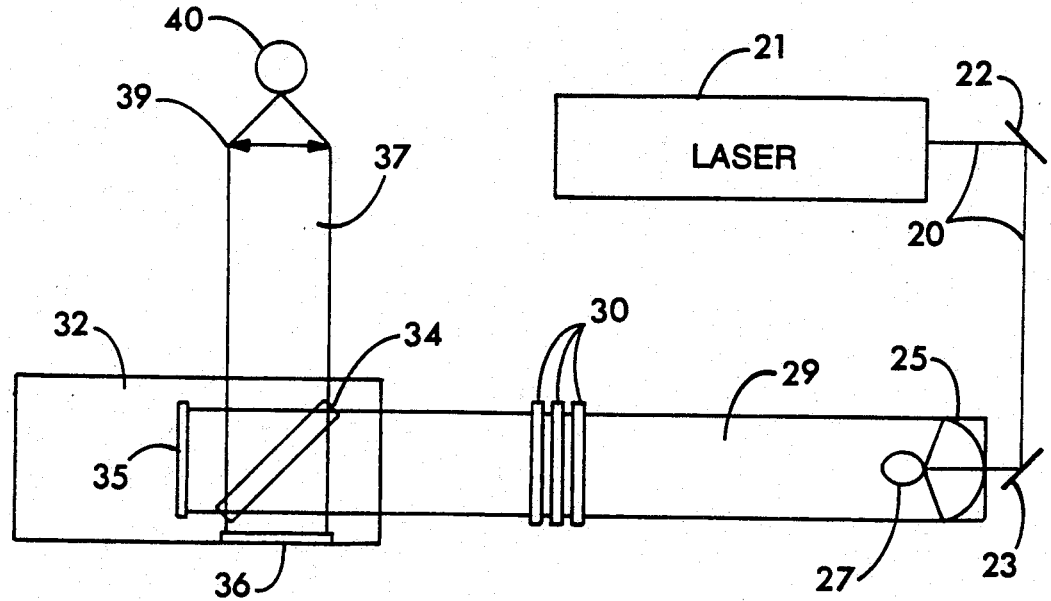
FIG. 2 is a schematic view of a Raman spectrometer in accordance with the prior art which utilizes a filter stack in the interferometer input beam.
Figure 3:
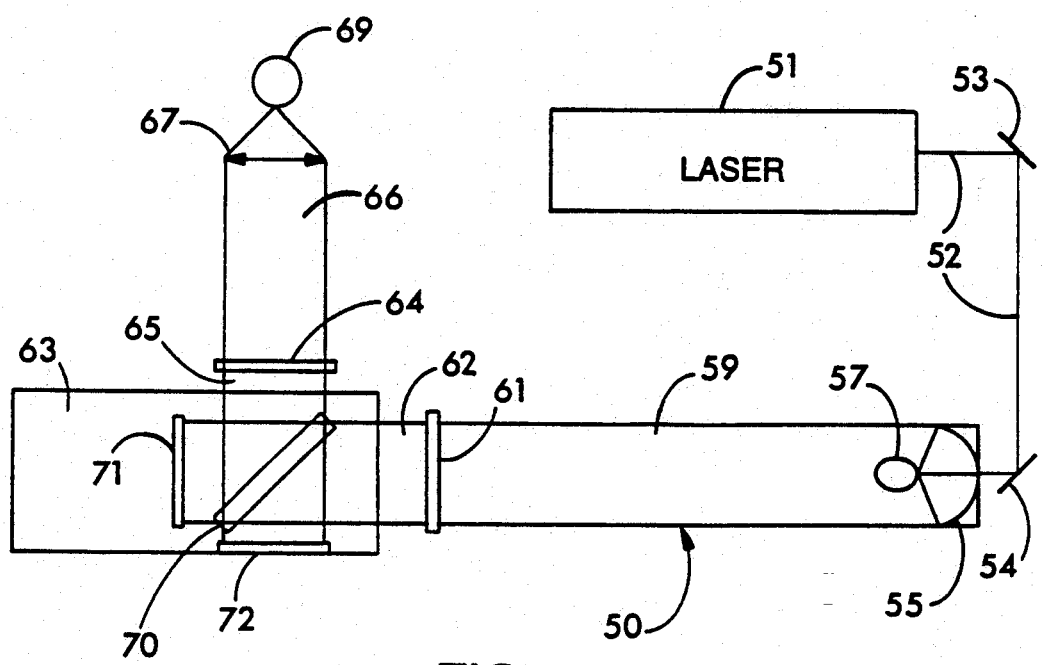
FIG. 3 is a schematic view of a Raman spectrometer in accordance with the present invention.

The preferred arrangement of a Raman spectrometer in accordance with the present invention is shown generally at 50 in FIG. 3. The spectrometer 50 includes a laser 51 (e.g., a Nd:YAG laser) which provides a narrow beam of radiation 52. The beam 52 is reflected by mirrors 53 and 54 to sample collection optics 55 to strike a sample 57. The sample collection optics 55 collimates the radiation reflected from the sample into an input beam 59 which is passed through a first filter 61 which provides a filtered beam 62 to an interferometer 63. The output beam 65 of the interferometer is passed through a second filter 64 to provide a filtered beam 66 which passes into focusing optics 67 which focuses the beam on a detector 69. The interferometer 63 may comprise a Michelson interferometer having a beam splitter 70, a moving mirror 71 and a stationary mirror 72. The interferometer 63 and other individual components of the spectrometer shown in FIG. 3 are conventional and well known in the art and any suitable components or spectrometer structures can be utilized. It is also understood that the electrical output signal of the detector 69 may be subjected to conventional Fourier transform processing in correlation with the driving of the moving mirror 71 of the interferometer 63 to provide analysis of the Raman spectrum from the sample. It is also understood that interferometers other than Michelson interferometers may be utilized.

In a typical implementation of optical subtraction, the subtraction would occur at the detector element. However, in the present invention, the subtraction is believed to occur in the interferometer 63 as a result of multiple modulations of the input beam and the output beam and the superposition of these modulations. The result of this configuration, in which the filters 61 and 64 are adjacent to the interferometer 63 in the input and output beams, respectively, is a synergistic filtering which exceeds the sum of filtering obtained by the individual filters 61 and 64. For example, only two filters may be needed to achieve attenuations in excess of $10^{-7}$ of the Rayleigh line while the passband throughput of the Raman lines may typically be 60% or greater. Mounting of the filters close to the interferometer is required only to ensure that the reflected image from the filter is mostly superimposed on the interferometer mirror. As the filters are moved further away from the interferometer, or are tilted further from the normal, the image reflected back from the filter(s) may wholly or partially miss the interferometer mirror(s) and, as a result, negate the effect.

Figure 5:
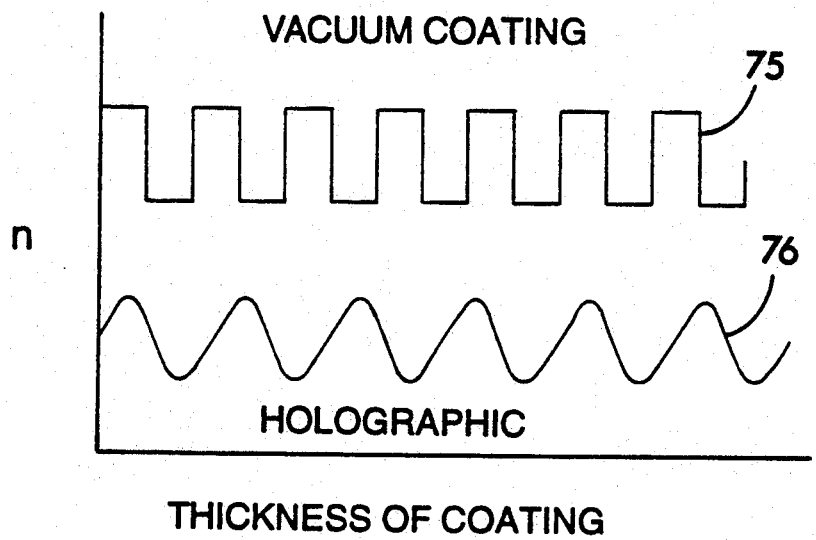
FIG. 5 are illustrative graphs showing the index of refraction in a typical vacuum coated dielectric filter and in a holographic filter.

The filters 61 and 64 may be selected from various conventional and specialized designs for such filters. In certain circumstances, dielectric filters may be utilized as the filters 61 and 64. However, it is particularly preferred in the present invention that the filters 61 and 64 be holographic notch filters. FIG. 5 illustrates the index of refraction as a function of the thickness of the coating for a vacuum coated dielectric filter, as indicated by the line 75, and a holographic filter, as indicated by the line 76. It is particularly significant that the index of refraction of the holographic filter varies in a sinusoidal manner rather than as a square wave function as in the vacuum coated filter. This characteristic allows the holographic filter to achieve less passband ripple. In addition, because the process of producing the holographic filters is photographic, much better repeatability is also possible. Preferred filters are available from Kayser Optical Systems, Inc., 371 Parkland Plaza, Ann Harbor, Mich., which are holographic notch filters having a relatively thick layer of photographic emulsion which is equivalent to a very high order dielectric filter. Consequently, very narrow rejection bandwidths are obtained.

Figure 4:
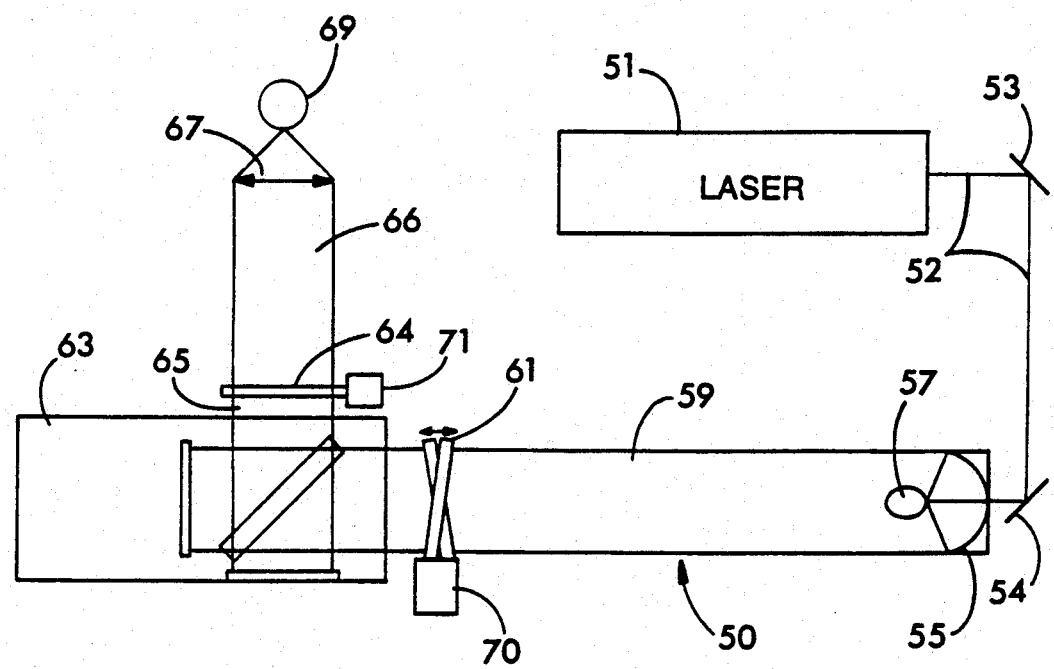
FIG. 4 is a schematic view of the Raman spectrometer of the present invention as in FIG. 3 with tilting of a holographic notch filter illustrated.
Figure 6:
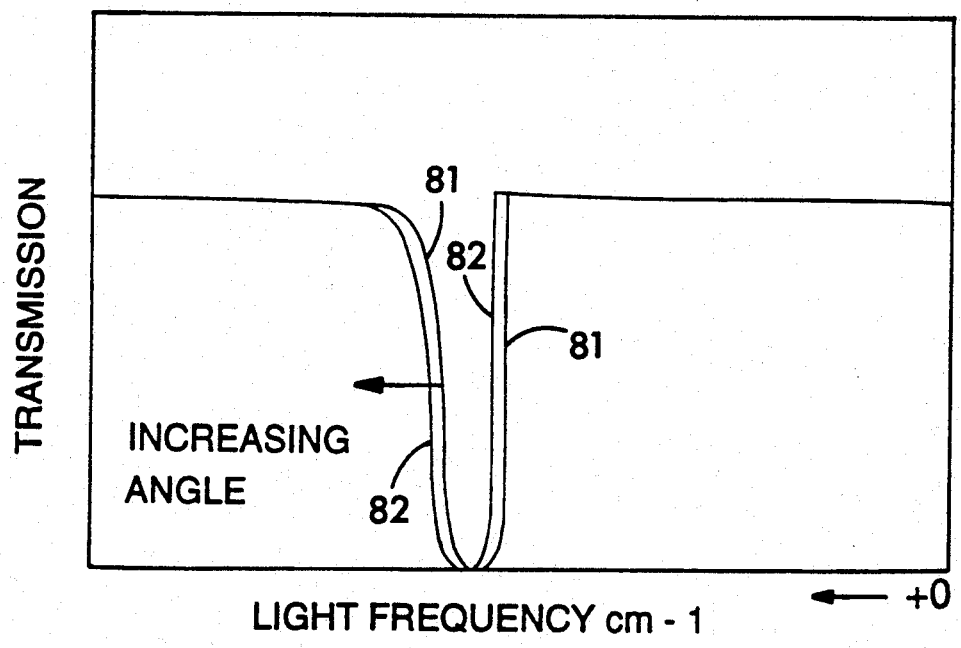
FIG. 6 is a graph illustrating the transmission through a holographic notch filter and the effect of tilting the filter with respect to the incoming beam.

An additional benefit of the present invention is the apparent change in thickness of a filter when a filter is tilted relative to the normal angle of incidence of the collimated input or output beam. Such tilting of the input filter 61 is illustrated in FIG. 4. The filters can be mounted in mounting mechanisms 70 and 71 of conventional design which allow the filters to be tilted by fractions of a degree to high precision using vernier adjustment. As the angle of incidence of the collimated radiation on the filter deviates from the normal, the layers of the filter appear to the incident radiation to be thicker. Consequently, the cutoff frequency of the combined filter system becomes higher, as illustrated in FIG. 6 which shows transmission through the filters with normal incidence at the line 81 and transmission for a small tilt angle at the line 82. One or both of the filters can be tilted up to about 10° from the normal to tune the frequency of the filter stop-band and passband, enabling the filters to be used with a variety of samples having different Raman lines and allowing less precise notch filters to be used. The ability to tune the filters allows one to operate the passband of the filter closer to the Rayleigh line, which is the analog of 0 cm$^{-1}$ to the FTIR spectrometer, thus making species with absorptions close to that line (typically those molecules that contain large atoms, i.e., high atomic weight) visible in the Raman spectrum. The width of the filter bandwidth is dependant on the holographic process and its apparent thickness and in fact increases when the filter is tilted away from normal. What is gained by tuning the filter is the ability to maximize the Stokes side bandwidth at the expense of the anti-Stokes bandwidth.

It is understood that the invention is not limited to the particular embodiments set forth herein as illustrative, but embraces such modified forms thereof as come within the scope of the following claims.

What is claimed is:

1. Apparatus for Raman spectrometry comprising:
   (a) a source of a beam of electromagnetic radiation at a selected wavelength suitable for Raman spectrometry and means for directing the beam from the source onto a sample;
   (b) sample collection optics means for collecting the radiation reflected from the sample into a beam;

(c) an interferometer mounted to receive the beam from the sample collection optics means as its input beam and to provide a modulated output beam;

(d) a detector capable of detecting the wavelengths of the radiation reflected from the sample, and optics means for focusing the output beam from the interferometer onto the detector;

(e) a first filter interposed in the input beam to the interferometer at a position adjacent to the interferometer and a second filter interposed in the output beam from the interferometer at a position adjacent to the interferometer, the filters constructed to provide substantial attenuation of the wavelength of the Rayleigh line reflected from the sample while substantially passing the Raman lines reflected from the sample, the two filters arranged to provide optical subtraction in the interferometer of wavelengths at the Rayleigh line.

2. The apparatus of claim 1 wherein the filters comprise holographic notch filters.

3. The apparatus of claim 2 wherein the interferometer is a Michelson interferometer.

4. The apparatus of claim 2 including means for mounting the holographic notch filter in the input beam to allow tilting of the filter with respect to the input beam of the interferometer.

5. The apparatus of claim 2 including means for mounting the first holographic notch filter for tilting with respect to the input beam and means for mounting the second holographic notch filter for selective tilting with respect to the output beam of the interferometer.

6. A method of filtering the Rayleigh line of the radiation reflected from a sample which is collected and passed as the input beam to an interferometer, wherein the output beam of the interferometer is passed to and focused on a detector, comprising the steps of:

(a) interposing a notch filter in the input beam of the interferometer having an attenuation notch centered approximately at the Rayleigh line of the reflected radiation from the sample; and (b) interposing a notch filter in the output beam of the interferometer having an attenuation notch centered approximately at the Rayleigh line of the reflected radiation, wherein the two filters are arranged at positions adjacent to the interferometer to provide optical subtraction in the interferometer of wavelengths at the Rayleigh line.

7. The method of claim 6 wherein the notch filters comprise holographic notch filters.

8. The method of claim 7 further including the step of tilting at least one of the holographic notch filters to tune the position of the notch with respect to the Rayleigh line of the reflected radiation.

9. The method of claim 6 including the step of tilting at least one of the notch filters to tune the position of the notch with respect to the Rayleigh line of the reflected radiation.

* * * * *

UNITED STATES PATENT AND TRADEMARK OFFICE
CERTIFICATE OF CORRECTION

PATENT NO.  : 5,247,343
DATED       : September 21, 1993
INVENTOR(S) : Robert V. Burch It is certified that error appears in the above-indentified patent and that said Letters Patent is hereby corrected as shown below:

On the title page: Item [54] and Column 1, line 1, "SUBSTRACTION" should be --SUBTRACTION-- as written in the title of the application.

In column 1, line 3 of the patent, "SUBSTRACTION" should be --SUBTRACTION-- as written in the application on page 1, line 2.

Signed and Sealed this

Third Day of May, 1994

Attest:

BRUCE LEHMAN

Attesting Officer

Commissioner of Patents and Trademarks